(No Model.) 3 Sheets—Sheet 1.
W. H. DOANE & G. W. BUGBEE.
CIRCULAR SAWING MACHINE.
No. 311,421. Patented Jan. 27, 1885.
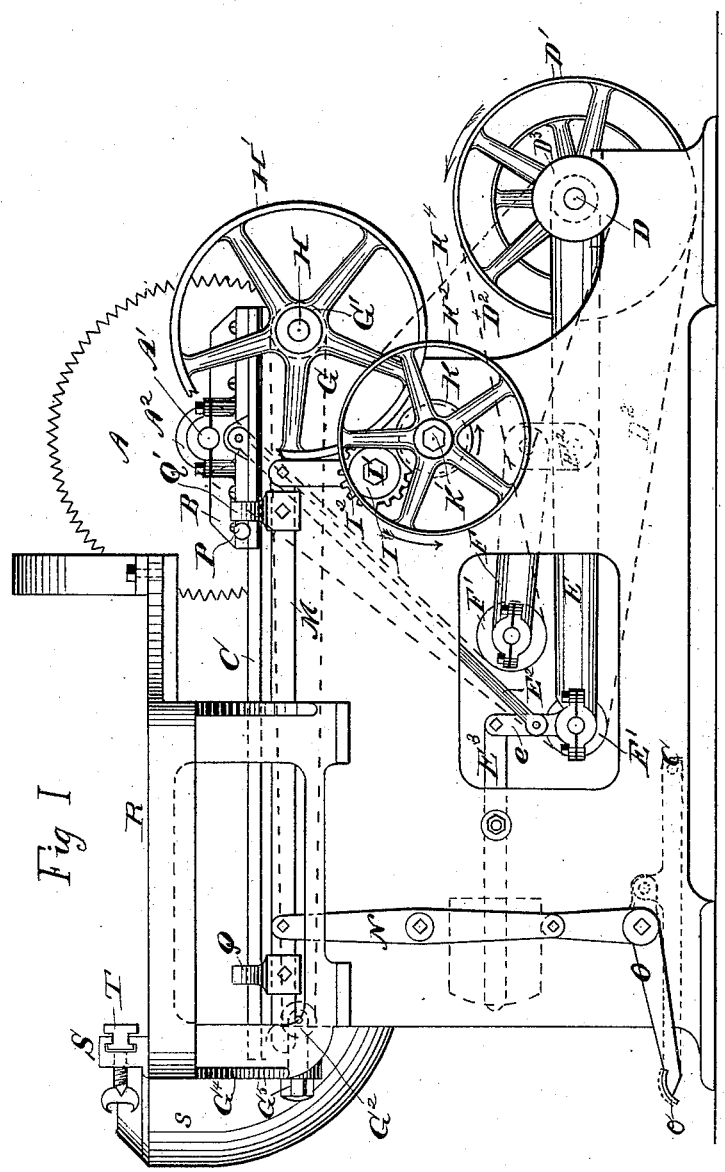
Fig. I
Witnesses.
W. M. Hannay
Edward Walker
Inventors.
William H. Doane
George W. Bugbee (No Model.) 3 Sheets—Sheet 2.
W. H. DOANE & G. W. BUGBEE.
CIRCULAR SAWING MACHINE.
No. 311,421. Patented Jan. 27, 1885.
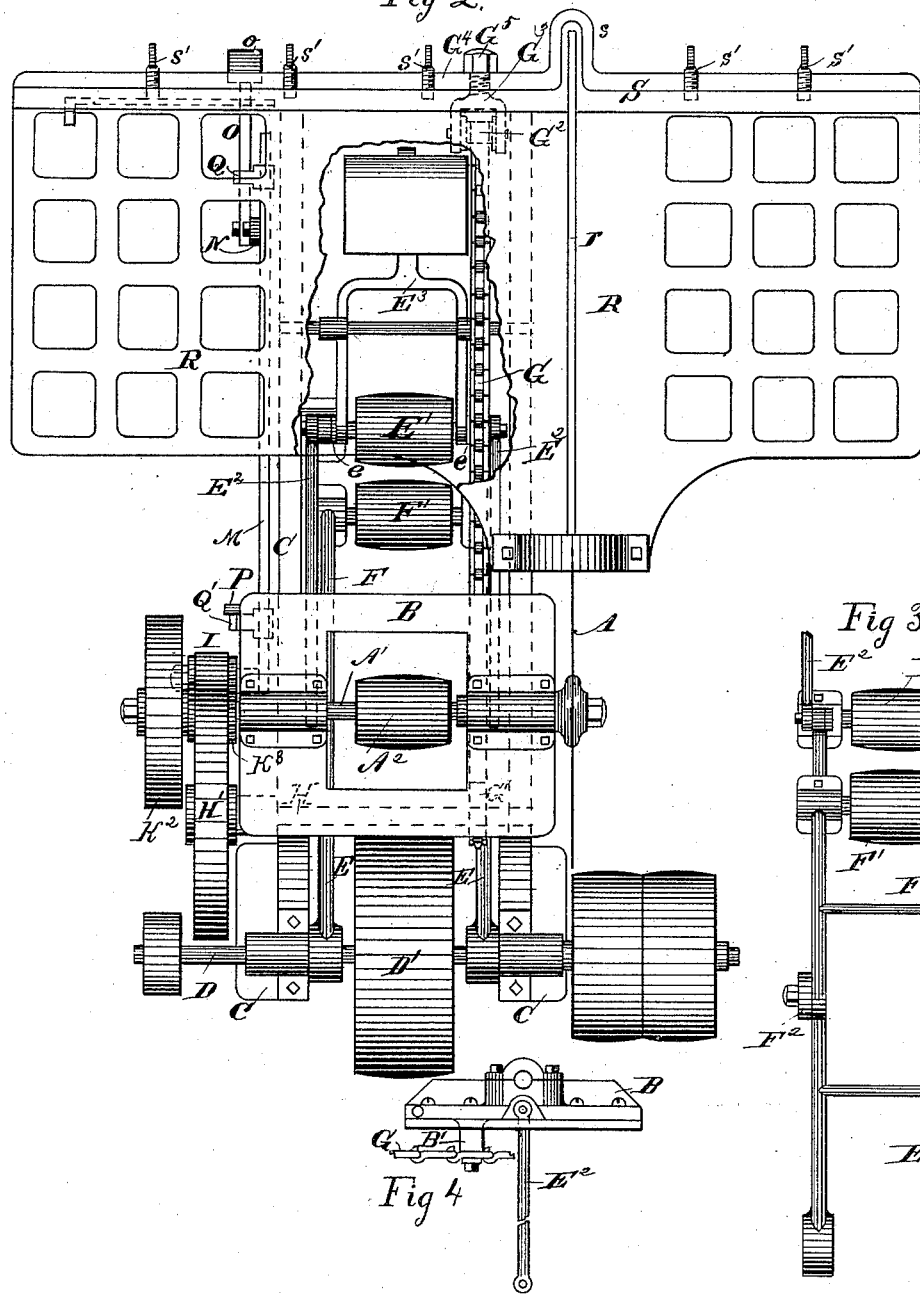
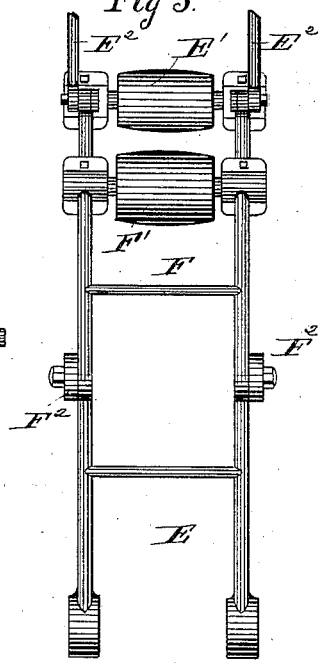
Witnesses.
W. M. Hannay
Edward Walker
Inventors.
William H. Doane
George W. Bugbee
by their attorney

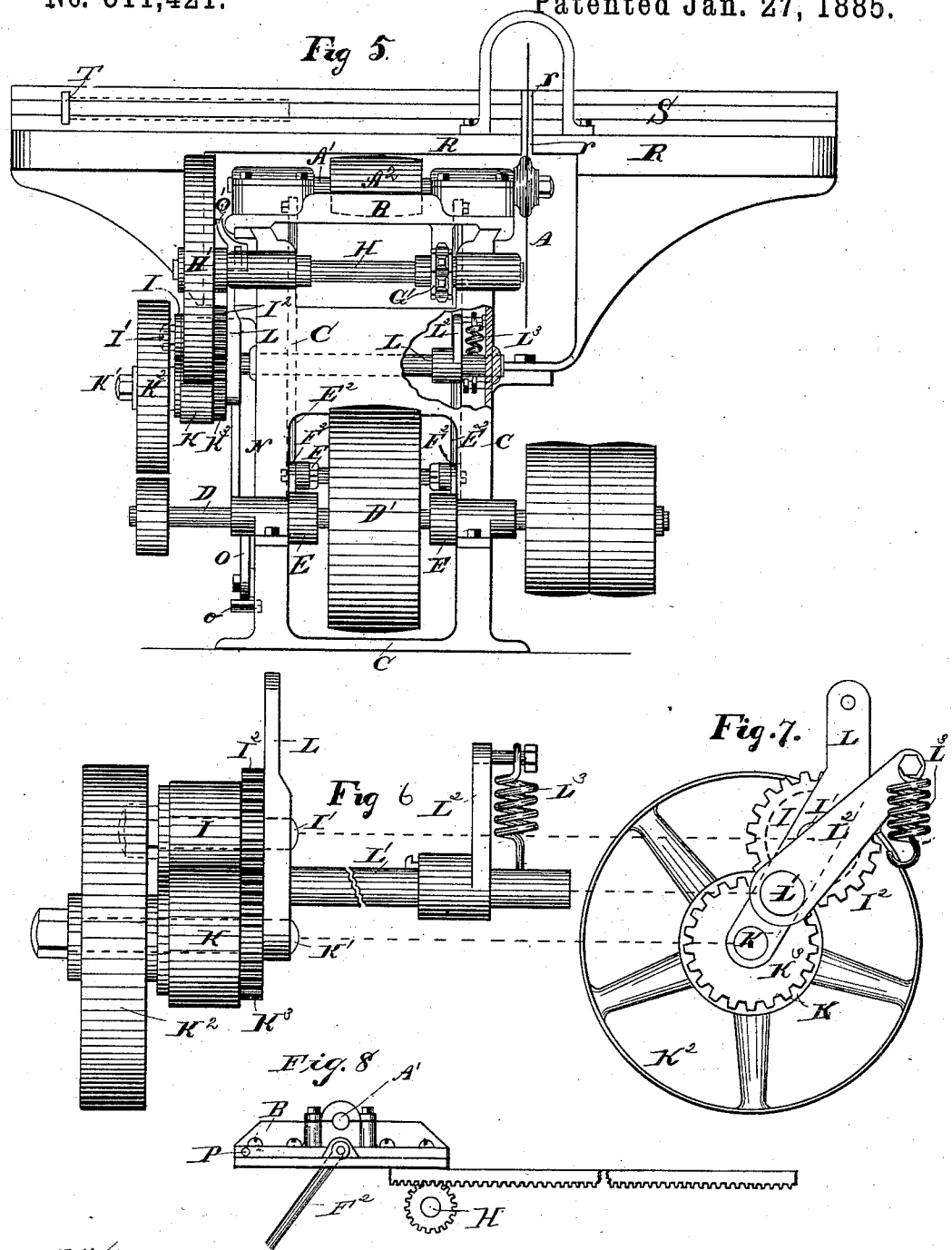

UNITED STATES PATENT OFFICE.

WILLIAM H. DOANE AND GEORGE W. BUGBEE, OF CINCINNATI, OHIO.

CIRCULAR SAWING MACHINE.

SPECIFICATION forming part of Letters Patent No. 311,421, dated January 27, 1885.

Application filed September 6, 1884. (No model.)

*To all whom it may concern:*

Be it known that we, WILLIAM H. DOANE and GEORGE W. BUGBEE, citizens of the United States, residing at Cincinnati, in the county of Hamilton and State of Ohio, have invented certain new and useful Improvements in Saw-Mills; and we do hereby declare the following to be a full, clear, and exact description of the invention, such as will enable others skilled in the art to which it appertains to make and use the same.

Our invention consists of certain novel features of organization, which will be specifically pointed out in the claims at the close of this specification.

We illustrate our invention as applied to a circular-saw mill the saw of which is mounted on a reciprocating carriage. One of the novel features provides for advancing the saw-carriage by friction-gearing, so that the rate of advance is under the control of the operator while the mill is running. Another feature provides for retrograding as well as advancing the saw-carriage by friction-gearing. Another feature provides for the automatic stoppage of the travel of the saw-carriage in either direction. These features are preferably all embodied in the same saw-mill; but we claim each distinct part of our invention separately.

In order that the invention may be clearly understood, we have illustrated in the annexed drawings, and will proceed to describe, one practical machine embodying each and every part thereof.

Figure 1 is a side elevation of the machine. Fig. 2 is a plan view of the same minus a portion of the saw-table, broken away to expose the device below. Fig. 3 is a rear end elevation. Figs. 4 to 7 illustrate portions of the machine in detail. Figs. 6 and 7 are drawn on a larger scale than the other figures. Fig. 8 illustrates a modification of a part of the machine referred to hereinafter.

The same letters of reference indicate identical parts in all the figures.

The shaft $A'$ of the circular saw A is journaled in bearings on a sliding carriage, B, mounted on shears of the main frame C of the machine, and carries a pulley, $A^2$, which is driven by a belt, $D^2$, from the pulley $D'$ on the main shaft D, located at the rear end and near the base of the main frame. One side of the belt $D^2$ (shown by dotted lines in Fig. 1) passes under a pulley, $E'$, the shaft of which is journaled in bearings on the outer end of a swinging frame, E, pivoted on the main shaft D. The other side of belt $D^2$ passes under the pulley $F'$ of a belt-tightener, F, which is carried by the swinging frame E, and connected thereto by links $F^2 F^2$. The outer end of the swinging frame E is connected to the sliding saw-carriage by connecting-rods $E^2 E^2$, in the manner shown best in Fig. 1, so that the travel of the carriage will rock the swinging frame, the distance from the axis of pulley $E'$ to the axis of the saw-shaft being practically maintained in all positions of the parts. The length of the swinging frame E is so proportioned with reference to the greatest travel of the saw-carriage that when the latter is at either extreme thereof the former projects about horizontally from the main shaft. The swinging frame is partially counterbalanced by a weighted lever, $E^3$, fulcrumed on the main frame and connected by links $e$ to the outer end of said frame. The saw-carriage is traversed back and forth by an endless chain, G, which travels beneath the carriage, passing around a driving sprocket-wheel, $G'$, keyed to a cross-shaft, H, at the rear end of the machine, and around a pulley, $G^2$, at the front end thereof, the pulley $G^2$ being journaled in a yoke, $G^3$, the screw-threaded shank of which passes through a hole in a fixed plate, $G^4$, and is provided with a nut, $G^5$, for adjusting the yoke to properly stretch the endless chain. The saw-carriage has a downwardly-projecting arm, $B'$, which is engaged by one of the links of chain G, as shown in Fig. 4. Shaft H is driven through means of a friction-pulley, $H'$, fastened to it. Friction-pulley $H'$ is driven alternately in reverse directions by a pair of friction-drivers, I and K, journaled, respectively, on studs $I'$ and $K'$ of a lever, L, which is fastened on a rock-shaft, $L'$. The rock-shaft $L'$ is journaled in the main frame, and provided with an arm, $L^2$, to which one end of a spiral spring, $L^3$, is attached, the other end of said spring being attached to the main frame. Stud $K'$ also carries a pulley, $K^2$, and a spur-wheel, $K^3$. Friction-driver K, pulley $K^2$, and spur-wheel $K^3$ are all fastened together. Spur-wheel $K^3$ meshes with a spur-wheel, I², fastened to friction-driver I. Pulley K² is driven by a straight belt, K⁴, from a pulley, D³, on the main shaft D, which latter revolves in the direction indicated by the arrow applied to pulley D′ in Fig. 1, so that the friction-driver K will be revolved in the direction required for turning pulley H′ to retrograde the saw-carriage, while friction-driver I, revolving in the opposite direction, is adapted to turn pulley H′ so as to advance the saw-carriage. Spring L³ tends to turn the rock-shaft L′ so as to throw friction-driver K into driving-contact with friction-pulley H′ and friction-driver I out of contact. Friction-driver K is of greater diameter than friction-driver I, so that the saw-carriage will be retrograded with a speed greater than that with which it is advanced. The upper end of lever L is connected by a horizontal rod, M, to the upper arm of a vertically-arranged lever, N, the lower arm of which is pivoted to the upright arm of an elbow foot-lever, O, the horizontal arm of which projects to the front side of the machine, and is provided with a suitable pedal, o. By pressing with his foot on foot-lever O the operator can rock shaft L′ against the stress of spring L², so as to release friction-pulley H′ from friction-driver K and throw friction-driver I into driving-contact therewith. The travel of the saw-carriage in either direction is automatically stopped by a tappet-gear consisting of a tappet-arm, P, on the saw-carriage and two tappets, Q and Q′, on rod M. The tappets are adjustable on rod M, so that the travel of the carriage may be changed at will. The saw-table R, suitably mounted on the main frame, and elevated above the shears thereof, is provided at the front side with a fence, S, constructed with a suitable loop, s, at a point directly opposite the saw-slot r. A scale is marked on the top of the fence to govern the operator in cutting off pieces accurately to any desired length.

For convenience in cutting off a number of pieces to the same length, the fence is constructed with a T-slot for the reception of a gage, T, which may be adjusted along the said slot, and secured at any desired point by set-screws s′, located at different points along the fence. The main shaft D carries the usual fast and loose pulleys for a belt from a line-shaft. When the main shaft is running, and when there is no pressure on foot-lever O, the saw-carriage will be maintained in its retrograded position, as shown in Fig. 1, for although spring L³ tends to throw friction-driver K into driving-contact with friction-pulley H′, further retrogression of the saw-carriage is stopped by the tappet-gear, which operates now antagonistically to the spring L³, and tends to throw friction-driver K out of gear. The saw runs continuously. When it is to be advanced, the operator presses the foot-lever down with his foot, the effect of which is to throw friction-driver I into driving-contact with friction-pulley H′. The pressure on the foot-lever being maintained, the saw-carriage advances until its tappet-arm P strikes tappet Q and forces rod M back, so as to throw friction-driver I out of gear. If the operator continues pressing on the foot-lever, the saw-carriage will remain at rest; but on withdrawing such pressure the spring L³ will rock shaft L′, so as to throw friction-driver K into gear, when the saw-carriage will be retrograded.

It is obvious that the saw-carriage may be started from and stopped at points intermediate of the extreme points of its travel as determined by the tappet-gear by properly working the foot-lever. Thus the machine could be operated without the tappet-gear, although it is preferred to use at least so much thereof as will effect an automatic stoppage of the saw-carriage at the extreme limit of its retrograde movement. The speed of the advance of the saw-carriage can also be governed by properly working the foot-lever to suit different kinds of work. By pressing hard on the foot-lever the full speed is obtained in sawing light work. By pressing on it more lightly the speed may be lessened in consequence of slippage between the friction-driver I and friction-pulley H′ in sawing thick lumber.

Many modifications may be made in the details of the machine without departing from the spirit of the invention. For instance, the spring L³ may be replaced by a reverse-pedal on the foot-lever mechanism, as indicated by dotted lines in Fig. 1. In that case the saw-carriage would remain at rest as long as neither foot-lever is depressed, and would be advanced or retrograded according as one or the other of the foot-levers is depressed. Instead of the endless chain G, a rack and pinion may be used to traverse the saw-carriage, the rack being secured to the saw-carriage and the pinion to the shaft H, as shown in Fig. 8. One of the rods, E², may be omitted. The foot-lever O may be replaced by a hand-lever.

We claim as our invention—

1. The combination, substantially as before set forth, of the saw-carriage, the endless chain connected therewith, the shaft and sprocket-wheel and friction-pulley for moving the chain, two friction-drivers for rotating the said friction-pulley alternately in reverse directions, the lever carrying the friction-drivers, and the foot-lever connected with said lever.

2. The combination, substantially as before set forth, of the saw-carriage, the endless chain connected therewith, the shaft and sprocket-wheel and friction-pulley for moving the chain, two friction-drivers for rotating the said friction-pulley alternately in reverse directions, the lever carrying the friction-drivers, the spring for turning the lever in one direction, and the foot-lever for turning it in the other direction.

3. The combination, substantially as before set forth, of the saw-carriage, the endless chain connected therewith, the shaft and sprocket-wheel and friction-pulley for moving the chain, two friction-drivers for rotating the said friction-pulley alternately in reverse directions, the lever carrying the said friction-drivers, the spring for turning the said lever in one direction, the foot-lever for turning it in the other direction, and the tappet-gear for automatically turning the lever carrying the friction-drivers to a middle position to throw both said friction-drivers out of gear.

In testimony whereof we affix our signatures in presence of two witnesses.

WILLIAM H. DOANE.
GEORGE W. BUGBEE.

Witnesses:
A. M. NEWKIRK,
A. O. BLAKEMORE.